S. FORGO.
PROCESS AND APPARATUS FOR MAKING GLASSWARE.
APPLICATION FILED NOV. 25, 1908.
958,613.
Patented May 17, 1910.
2 SHEETS—SHEET 2.
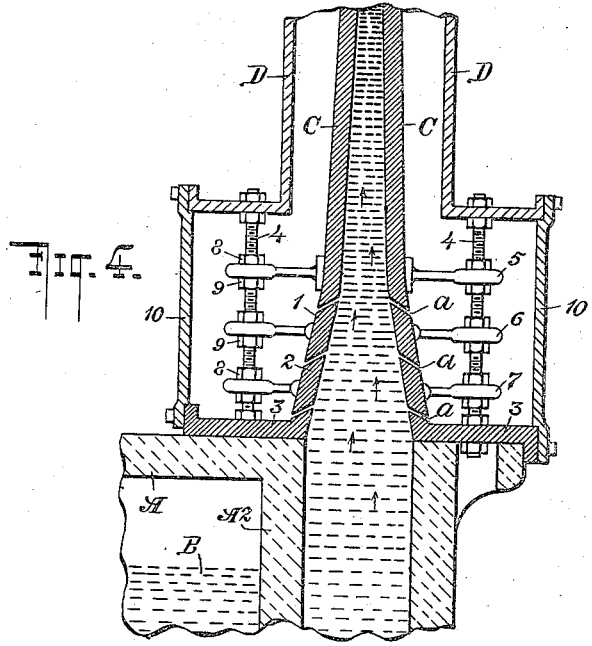
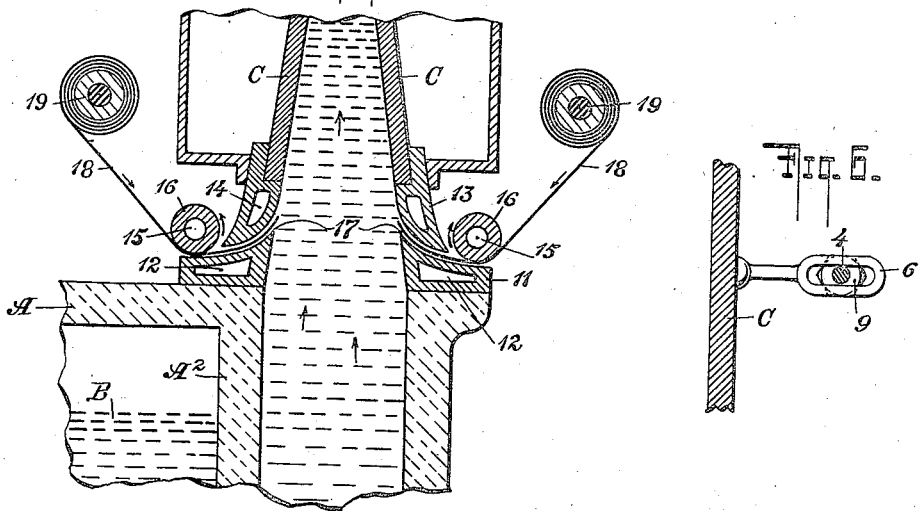
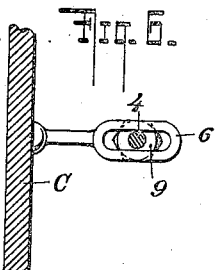
WITNESSES:
INVENTOR
STEPHAN FORGÓ
BY
ATTORNEYS

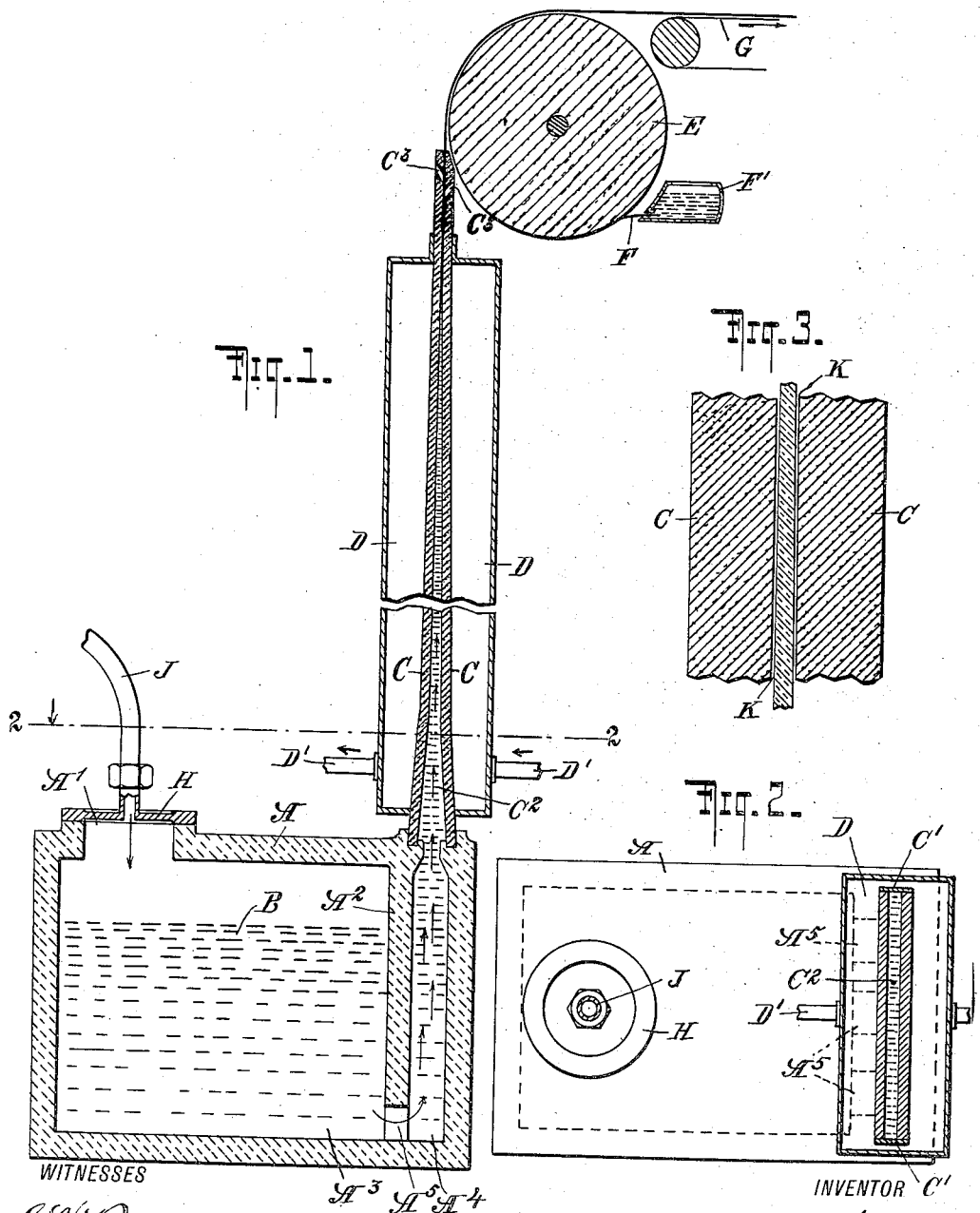

UNITED STATES PATENT OFFICE.

STEPHAN FORGÓ, OF NEW YORK, N. Y.

PROCESS AND APPARATUS FOR MAKING GLASSWARE.

958,613.  Specification of Letters Patent.  Patented May 17, 1910.

Application filed November 25, 1908. Serial No. 464,396.

*To all whom it may concern:*

Be it known that I, STEPHAN FORGÓ, a subject of the King of Hungary, and a resident of the borough of Manhattan, city, county, and State of New York, have invented certain new and useful Improvements in Processes and Apparatus for Making Glassware, of which the following is a specification.

My invention relates to the manufacture of glassware more particularly in the form of sheets, plates, rods and tubes and has for its object to provide means for making glass rapidly in a simple and effective manner and in such a way as to secure a uniform product having a perfectly smooth, clear and glossy surface.

In the accompanying drawings I have illustrated an apparatus for the manufacture of plate glass according to my invention.

Figure 1 is a vertical section of such apparatus; Fig. 2 is a horizontal section on line 2—2 of Fig. 1. Fig. 3 is a detail vertical section drawn upon an enlarged scale. Figs. 4 and 5 are sectional views of two other forms of my invention and Fig. 6 is a sectional plan of one of the plate holders shown in Fig. 4.

A is a suitable receptacle made for instance of fire clay and adapted to contain a mass of molten glass B, which may be filled in through the opening A'. The receptacle is divided by a partition $A^2$ into two compartments $A^3$ and $A^4$ communicating by means of apertures $A^5$ at the bottom of the partition $A^2$. At the top of the outlet compartment $A^4$ are set two porous plates C, which, together with end plate C' form a chamber of a shape corresponding in a general way to that of the article to be produced. Thus in the case of making plate glass the cross section of the chamber $C^2$ would be rectangular, as shown. The plates C converge toward their upper ends, which are placed at a distance from each other corresponding to the desired final thickness of the glass article to be reproduced. These plates are made of porous material, such as gas-retort carbon, and form the inner walls of a chamber D, adapted to contain water or other liquid which is supplied through pipes D', or the liquid may circulate as indicated. Adjacent to the upper ends of the plates C is located a roll E likewise made of porous material, for instance carbon, and this roll is kept moist in any suitable manner as by means of the wick F, which is carried by a tank F' containing water or other suitable liquid. A suitable conveyer G serves to carry away the finished material. The opening A' may be closed by means of a plate or cover H which is connected with a pipe J for the supply of compressed air.

The receptacle A having been filled with molten glass while the cover H was removed, or at least swung aside, said cover is brought to its closing position and compressed air is admitted through the pipe J into the compartment $A^3$. The pressure causes the molten glass to rise in the outlet compartment $A^4$ and into the chamber $C^2$. As soon as the glass reaches the moistened porous plates C C', it becomes cooled and at the same time the water which has reached the inner surfaces of the plates C C' is transformed into steam which rises along said plates in thin films, as indicated at K in Fig. 3, so that the glass is not in actual contact with the moistened walls. This is of material advantage for the reason that it prevents the glass from being affected by any inequalities of the plates C and also very materially reduces the friction opposed to the upward movement of the glass. I am therefore enabled to force the glass out of the apparatus at a considerable speed, thus securing a large output. The steam and any hot gases mixed therewith also form insulating layers which prevent the sudden cooling of the glass and allow the cooling to be regulated as desired by giving the plates C the proper shape and by varying the temperature and circulation speed of the cooling medium. The proportions of the parts are so selected that at the time the glass leaves the plates C at the top, it has been sufficiently cooled to be resistant enough for its further conveyance without endangering the glossy quality of its surface. The steam and other gases escape through apertures $C^3$ so as to prevent the formation of bubbles in the glass. The glass leaving the upper ends of the plates C is still flexible enough to be bent over the roller E, which cools the glass further and from there on the glass is kept straight, being carried away by a conveyer G or other suitable devices to a cooling chamber of any approved construction.

It will be noticed that the glass is expelled by pressure and that no pulling or drawing action is exerted on it and I thus avoid any danger of fracturing or stretching the sheet. Even in the case that the plates C should have considerable inequalities, against which the film of steam and gas would not afford full protection, such inequalities would disappear from the glass during the comparatively long path which it travels in the plastic condition after leaving the plates C. The glass having been cooled very gradually has exceedingly great strength. The formation or molding of the glass article proceeds gradually, concurrently with the gradual cooling.

I have described the application of compressed air as a means of expelling the molten glass from its receptacle; of course, other means may be employed for this purpose, for instance a plunger acting on the upper surface of the glass in the compartment $A^3$.

The employment of porous plates C is probably the simplest expedient for producing a film of gas in contact with the glass sheet. Instead of porous plates I may employ plates perforated at least in their lower portion, or the gas film instead of resulting from the evaporation of water may be produced in other manners, as for instance by means of thin paper strips inserted through the plates C so as to touch the molten glass and be carbonized thereby, the combustion gases performing the same function as the steam film hereinbefore referred to.

In Fig. 4 the plates C are made of non-porous material, and are supported upon plate 3. Openings in the lower portions of the sides C are partially filled with plates 1, 2 which are supported by holders 5, 6, 7. These holders, at the end opposite to plates 1, 2 are formed into loops, as shown for instance in Fig. 6. Rods 4, which are screw threaded and provided with nuts 8, 9 pass through said loops, and by means of said nuts and loops, the positions of plates 1, 2 may be adjusted both vertically and horizontally. Rods 4 are supported by plate 3 and a horizontal prolongation of the wall of chamber D. The apparatus is provided with doors 10 which, may be removed in order to adjust the position of the plates 1, 2. Openings a, which are left between the plates C and plates 1, between plates 1, 2, and between plates 2, 3, may be increased or decreased by an adjustment of the holders 5, 6, 7. The film producing substance enters through said apertures a from the chamber D.

In Fig. 5 I have shown a further modification in which a roll of paper 18, mounted on shaft 19 is carried by means of hollow roller 6, between metal pieces 11, 13, forming an opening 17 into the mass of glass. Channels 12, 14, 15 are provided in plates 11, 13 and the roller 16 respectively in order to prevent a premature combustion of the paper. The paper, as it touches the molten gas is carbonized and the combustion gases perform the same function as the steam film in the apparatus shown in Fig. 1.

I claim as my invention:

1. The herein described process of forming glass, which consists in forcing molten glass by pressure to flow between directing or molding surfaces, while interposing a film of gaseous material between said surfaces and the glass and gradually reducing the thickness of the glass as it proceeds between said surfaces.

2. The herein described process of forming glass, which consists in forcing molten glass by pressure to flow between directing or molding surfaces while interposing a film of cool gaseous material between said surfaces and the glass and gradually reducing the thickness of the glass as it proceeds between said surfaces and is cooled by the film.

3. The combination of the receptacle divided into an inlet compartment and an outlet compartment, means for exerting pressure in the inlet compartment, two spaced directing members extending from the outlet compartment and forming a gradually contracting chamber, and means for producing gaseous films on the inner surfaces of said members.

4. The combination of the receptacle divided into an inlet compartment and an outlet compartment, means for exerting pressure in the inlet compartment, two spaced directing members extending from the outlet compartment and forming a gradually contracting chamber, and means for applying a vaporizable liquid to the inner surfaces of said members.

5. The combination of the receptacle divided into an inlet compartment and an outlet compartment, means for exerting pressure in the inlet compartment, two spaced directing members extending from the outlet compartment and forming a gradually contracting chamber, said members being made of porous material, and liquid supply chambers, the inner walls of which are formed by said members.

6. The combination of the receptacle divided into an inlet compartment and an outlet compartment, means for exerting pressure in the inlet compartment, two spaced directing members extending from the outlet compartment and forming a gradually contracting chamber, means for producing gaseous films on the inner surfaces of said members, and a roller for guiding the glass after its passage between said members.

7. The combination of the receptacle divided into an inlet compartment and an outlet compartment, means for exerting pressure in the inlet compartment, two spaced directing members extending from the outlet compartment and forming a gradually contracting chamber, means for producing gaseous films on the inner surfaces of said members, a porous roller for guiding the glass after its passage between said members, and means for keeping said roller moist.

In witness whereof I have hereunto set my hand in the presence of two subscribing witnesses.

STEPHAN FORGÓ.

Witnesses:
   John Lotka,
   John A. Kehlenbeck.